United States Patent
Hui (10) Patent No.: US 10,963,982 B2
(45) Date of Patent: Mar. 30, 2021

(54) VIDEO WATERMARK GENERATION METHOD AND DEVICE, AND TERMINAL

(71) Applicant: BEIJING DAJIA INTERNET INFORMATION TECHNOLOGY CO., LTD., Beijing (CN)

(72) Inventor: Yiqun Hui, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 16/759,603

(22) PCT Filed: Oct. 11, 2018

(86) PCT No.: PCT/CN2018/109818
§ 371 (c)(1),
(2) Date: Apr. 27, 2020

(87) PCT Pub. No.: WO2019/080712
PCT Pub. Date: May 2, 2019

(65) Prior Publication Data
US 2020/0311858 A1    Oct. 1, 2020

(30) Foreign Application Priority Data
Oct. 27, 2017    (CN) .......................... 201711023729.0

(51) Int. Cl.
*G06T 1/00* (2006.01)
*H04N 21/8358* (2011.01)

(52) U.S. Cl.
CPC ....... *G06T 1/0085* (2013.01); *H04N 21/8358* (2013.01); *G06T 2201/0051* (2013.01)

(58) Field of Classification Search
CPC .................................................. G06T 1/0085
(Continued)

(56) References Cited

U.S. PATENT DOCUMENTS

2008/0273741 A1* 11/2008 Fujii .................. H04N 1/32208
382/100
2014/0241568 A1    8/2014 Yamada et al.
2017/0180822 A1*  6/2017 Pradel ................. H04N 21/234

FOREIGN PATENT DOCUMENTS

CN    101351986 A    1/2009
CN    103049880 A    4/2013
(Continued)

OTHER PUBLICATIONS

International Search Report and Written Opinion issued by the International Searching Authority (ISA/US) in PCT Application No. PCT/CN2018/109818 dated Jan. 4, 2019. 10 pages, including English translation of International Search Report.

(Continued)

*Primary Examiner* — Eileen M Adams
*Assistant Examiner* — Daniel T Tekle
(74) *Attorney, Agent, or Firm* — Meunier Carlin & Curfman LLC (57) ABSTRACT

Provided in the embodiments of the present application are a video watermark generation method and device, and a terminal, the method comprising: determining spatial-domain watermarks and time-domain values corresponding to each video image frame in a video file according to a preset spatial-domain watermark template and a time-domain watermark template, each spatial-domain watermark having the same number of pixel values; determining the edge distribution of each video image frame in the video file; and generating a watermark for the video file according to the spatial-domain watermarks and time-domain values which correspond to the each video image frame and the edge distribution of the each video image frame. The watermark generated by using the video watermark generation solution provided by the embodiments of the present application is (Continued)

better concealed and will not be easily discovered by malicious parties.

13 Claims, 4 Drawing Sheets

(58) Field of Classification Search
USPC .......................................................... 386/260
See application file for complete search history.

(56) References Cited

FOREIGN PATENT DOCUMENTS

| | | |
|---|---|---|
| CN | 103455966 A | 12/2013 |
| CN | 106454182 A | 2/2017 |
| CN | 107911641 A | 4/2018 |
| WO | 2007127590 A2 | 11/2007 |

OTHER PUBLICATIONS

Niu, X-M., M. Schmucker, and C. Busch. "Video Watermarking Based on Time-Axis Template" Acta Electronica Sinica 32.8 (2004): 1236-1237. Includes English translation of Abstract.

* cited by examiner

VIDEO WATERMARK GENERATION METHOD AND DEVICE, AND TERMINAL

CROSS-REFERENCE TO RELATED APPLICATIONS

The present application is a National Stage of International Application No. PCT/CN2018/109818, filed Oct. 11, 2018, which claims the priority of Chinese patent application No. 201711023729.0, filed with Chinese Patent Office on Oct. 27, 2017, and entitled "Video Watermark Generation Method and Device, and Terminal", the contents of which are incorporated by reference herein in its entirety.

FIELD

The present application relates to the field of video processing, in particular to a video watermark generation method and device, and a terminal.

BACKGROUND

At present, in order to protect video copyright, video watermarks are generally embedded into the videos uploaded by users on a video broadcasting platform. Video watermarks can be divided into spatial-domain watermarks and transformation-domain watermarks. Earlier video watermark algorithms are essentially time-domain, and through changing the gray level of some pixels, the watermark information to be concealed is embedded therein. The spatial-domain method has the advantages of simple algorithm, high speed and easy realization, moreover, carrier image and watermark information can be recovered in an almost lossless manner, therefore, the spatial-domain watermarks are used widely.

Specifically, the method of realizing spatial-domain watermarks can be subdivided into the following several methods.

(1) A least significant bit method: in the method, the lowest bits of the raw data are utilized to conceal information, specifically, how many bits should be taken is determined under the principle that the information cannot be perceived by human auditory or visual system, where, the lowest bits of the raw data can mean: several pixels with the lowest gray level in the original video image.

(2) A Patchwork method: the core of the method is to increase the brightness value at one point and reduce the brightness value at another corresponding point to load digital watermarks through arbitrarily selecting N image points.

(3) A document structure fine-tuning method: in the technology in which specific binary information is concealed in the general document graph image, encoding is finished mainly through vertical movement of line spacing, horizontal adjustment of word spacing and adjustment of character characteristics, to embed spatial-domain watermarks.

Although the spatial-domain watermarks have the above advantages, the spatial-domain watermarks are easily recognized and substituted by outlaws maliciously, finally resulting in illegal stealing of video copyrights.

SUMMARY

An embodiment of the present application provides a video watermark generation method and device, and a terminal, so as to solve the problem of easy recognition and substitution by outlaws maliciously existing in the related video watermark generation solution.

According to one aspect of the present application, a video watermark generation method is provided. The method includes: determining a spatial-domain watermark and a time-domain value corresponding to each video image frame in a video file according to a preset spatial-domain watermark template and a preset time-domain watermark template; determining edge distribution of the each video image frame in the video file; and generating a watermark for the video file according to the spatial-domain watermark and time-domain value corresponding to the each video image frame and the edge distribution of the each video image frame in the video file.

Optionally, the spatial-domain watermark has the same number of pixel values.

Optionally, the generating the watermark for the video file according to the spatial-domain watermark and time-domain value corresponding to the each video image frame and the edge distribution of the each video image frame in the video file includes: for the each video image frame in the video file, determining a pixel brightness value corresponding to each pixel point in the video image, a spatial-domain value corresponding to a pixel value of each pixel point in the spatial-domain watermark corresponding to the video image, the time-domain value corresponding to the video image and an edge parameter value corresponding to each pixel point in the edge distribution of the video image, where the spatial-domain value indicates an adjustment direction of the pixel brightness value, and the edge parameter value indicates whether a pixel point is located at an edge; and determining a target pixel brightness value corresponding to each pixel point in a video image embedded with watermarks according to the pixel brightness value, the edge parameter value, the spatial-domain value and the time-domain value corresponding to the each pixel point in the each video image frame.

Optionally, the determining the target pixel brightness value corresponding to each pixel point in the video image embedded with watermarks according to the pixel brightness value, the edge parameter value, the spatial-domain value and the time-domain value corresponding to the each pixel point in the each video image frame includes: for the each pixel point in the each video image frame, determining a product value of the spatial-domain value, the time-domain value, the edge parameter value corresponding to the each pixel point and a preset constant; and determining a sum of the product value and the pixel brightness value to be the target pixel brightness value corresponding to the each pixel point in the video image embedded with watermarks.

Optionally, the determining the spatial-domain watermark and the time-domain watermark corresponding to each video image frame in the video file according to the preset spatial-domain watermark template and the preset time-domain watermark template includes: acquiring the preset spatial-domain watermark template; for the each video image frame in the video file, determining resolution of the video image; adjusting resolution of the preset spatial-domain watermark template to be equal to the resolution of the video image, and generating the spatial-domain watermark corresponding to the video image; acquiring the preset time-domain watermark template; and for the each video image frame in the video file, determining the time-domain value corresponding to the video image based on a transformation rule of a time-domain value in the preset time-domain watermark template.

Optionally, the spatial-domain watermark template includes pixel points with pixel values being a first preset value and a second preset value; and the time-domain watermark template is a result sequence generated when a cosine curve of a first preset frequency samples according to a second preset frequency.

According to another aspect of the present application, a video watermark generation device is provided. The device includes: a watermark determining module, configured to determine a spatial-domain watermark and a time-domain value corresponding to each video image frame in a video file according to a preset spatial-domain watermark template and a preset time-domain watermark template; an edge processing module, configured to determine edge distribution of the each video image frame in the video file; and an embedded module, configured to generate a watermark for the video file according to the spatial-domain watermark and time-domain value corresponding to the each video image frame and the edge distribution of the each video image frame in the video file.

Optionally, the spatial-domain watermark has the same number of pixel values.

Optionally, the embedded module includes: a numerical value determining submodule, configured to, for the each video image frame in the video file, determine a pixel brightness value corresponding to each pixel point in the video image, a spatial-domain value corresponding to a pixel value of each pixel point in the spatial-domain watermark corresponding to the video image, the time-domain value corresponding to the video image and an edge parameter value corresponding to each pixel point in the edge distribution of the video image; where the spatial-domain value indicates an adjustment direction of the pixel brightness value, and the edge parameter value indicates whether a pixel point is located at an edge; and a target pixel value determining submodule, configured to determine a target pixel brightness value corresponding to each pixel point in a video image embedded with watermarks according to the pixel brightness value, the edge parameter value, the spatial-domain value and the time-domain value corresponding to the each pixel point in the each video image frame.

Optionally, the target pixel value determining submodule includes: a first determining unit, configured to, for the each pixel in the each video image frame, determine a product value of the spatial-domain watermark value, the time-domain value, the edge parameter value corresponding to the each pixel point and a preset constant; and a second determining unit, configured to determine a sum of the product value and the pixel brightness value to be the target pixel brightness value corresponding to the each pixel point in the video image embedded with watermarks.

Optionally, the watermark determining module includes: a first acquisition submodule, configured to acquire the preset spatial-domain watermark template; an adjustment submodule, configured to, for the each video image frame in the video file, determine the resolution of the video image, and adjust the resolution of the spatial-domain watermark template to be equal to the resolution of the video image to generate a spatial-domain watermark corresponding to the video image; a second acquisition submodule, configured to acquire the preset time-domain watermark template; and a time-domain watermark determining sub-module, configured to determine the time-domain value corresponding to the video image based on a transformation rule of a time-domain value in the preset time-domain watermark template for the each video image frame in the video file.

Optionally, the spatial-domain watermark template includes pixel points with pixel values being a first preset value and a second preset value; and the time-domain watermark template is a result sequence generated when a cosine curve of a first preset frequency samples according to a second preset frequency.

According to another aspect of the present application, a terminal is provided. The terminal includes: a memory, a processor, and a video watermark generating program stored on the memory and capable of running on the processor, where the video watermark generating program is executed by the processor to realize any of the video watermark generation methods in the present application.

According to another aspect of the present application, a computer readable storage medium is provided. The computer readable storage medium is stored with a video watermark generating program thereon, and the video watermark generating program is executed by a processor to realize any of the video watermark generation methods in the present application.

According to still another aspect of the present application, a computer program product is provided, and when the computer program product is running on a computer, the computer is enabled to perform any of the video watermark generation methods in the present application.

Compared with the related art, the present application has the following advantages.

In the video watermark generation method provided in an embodiment of the present application, watermark data in two dimensionalities, that is, spatial-domain watermarks and time-domain watermarks, are embedded into the video image. Compared with the related art in which only spatial-domain watermarks are embedded, video watermarks generated through the video watermark generation method provided in an embodiment of the present application have a stronger performance in preventing malicious recognition. In addition, in the video watermark generation solution provided in an embodiment of the present application, watermarks are only embedded at the image edge of the video image, the watermarks are better concealed and are not easily discovered by those malicious parties.

The above description is merely a summary of the technical solution of the present application. In order to more clearly understand the technical means of the present application to implement the technical means based on the content of the description, moreover, in order to make the above and other objectives, characteristics and advantages of the present application more apparent and understandable, specific embodiments of the present application will be specifically enumerated below.

BRIEF DESCRIPTION OF DRAWINGS

Through reading detailed description of the following preferred embodiments, various advantages and beneficial effects will become clear and apparent for those skilled in the art. Accompanying drawings are merely used for illustrating preferred embodiments, rather than for limiting the present application. Moreover, in the whole accompanying drawings, the same reference numerals represent the same parts. The accompanying drawings are introduced below.

DETAILED DESCRIPTION OF THE EMBODIMENTS

Exemplary embodiments of the present disclosure will be described in detail below with reference to accompanying drawings. Although exemplary embodiments of the present disclosure are displayed in the accompanying drawings, however, it should be understood that, the present disclosure can be realized through various forms and should not be limited by the embodiments described herein. In contrary, these embodiments are provided to understand the present disclosure more thoroughly, and can completely convey the scope of the present disclosure to those skilled in the art.

Figure 1:
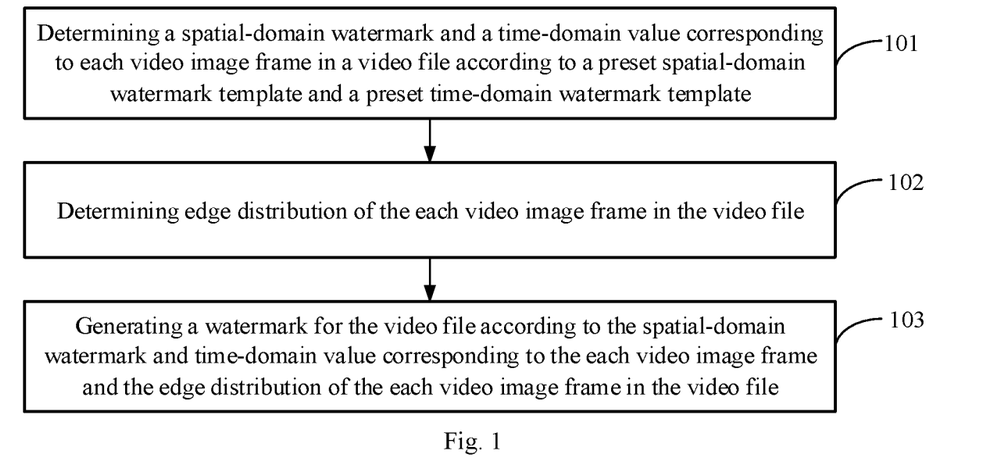
FIG. 1 is a flow chart of steps of a video watermark generation method of embodiment 1 of the present application.

Please refer to FIG. 1 which shows a flow chart of steps of a video watermark generation method of embodiment 1 of the present application.

The video watermark generation method of an embodiment of the present application can include the following steps.

Step 101: determining a spatial-domain watermark and a time-domain value corresponding to each video image frame in a video file according to a preset spatial-domain watermark template and a preset time-domain watermark template.

In an optional embodiment of the present application, one video file contains one or more video image frames. Through the method provided in an embodiment of the present application, a watermark is embedded into each video image frame in the video file.

Where, spatial-domain watermarks obtain the same resolution through scaling of the preset spatial-domain watermark template or the spatial-domain watermark template itself has the same resolution as the video file. The time-domain value can be determined through the time-domain watermark template and the position of the frame of the video on the time domain, and the time-domain value can be transformed between 1 and −1.

That is, the resolution corresponding to the preset spatial-domain watermark template can be different from the resolution of any video image frame in the video file, or can also be the same as the resolution of any video image frame in the video file, and both are permissible. When the resolution corresponding to the preset spatial-domain watermark template is different from the resolution of any video image frame in the video file, it can be as follows: for each video image frame in the video file, the preset spatial-domain watermark template is scaled, then the obtained spatial-domain watermark, with the resolution being identical to the resolution of the video image, is taken as the spatial-domain watermark corresponding to the video image. When the resolution corresponding to the preset spatial-domain watermark template is the same as the resolution of any video image frame in the video file, the resolution corresponding to the preset spatial-domain watermark template cannot be adjusted, and the preset spatial-domain watermark template is taken as the spatial-domain watermark corresponding to the video image with the same resolution. In one condition, resolutions corresponding to respective video image frames in the same video file can be identical, when the resolution corresponding to the preset spatial-domain watermark template is identical to the resolution of any video image frame in the video file, it can indicate that the resolution corresponding to the preset spatial-domain watermark template is identical to the resolution of each video image frame in the video file, that is, it can indicate that the spatial-domain watermark template itself has the same resolution as the video file.

The time-domain value corresponding to each video image frame can be determined through a preset time-domain watermark template and the position of each video image in the video file on the time domain, and the time-domain value can be transformed between 1 and −1.

For example, the spatial-domain watermark template can take a binary (including 1 and 0) image of any high resolution (bitmap), and has multiple cells corresponding to the pixel point in each image frame in the to-be-processed video, however, the number of pixels with pixel values being 1 and 0 in the binary image is the same, that is to say, the spatial-domain watermark template includes multiple pixel points with the pixel values being 1 and 0. Where, when the pixel value of one pixel point in the spatial-domain watermark template is 1, it indicates that when superimposed with the image, the pixel brightness value corresponding to the pixel point is adjusted upward, that is, the pixel brightness value is increased. When the pixel value of a pixel point in the spatial-domain watermark template is 0, it indicates that when imposed with the image, the pixel brightness value of the pixel point is adjusted downward, that is, the pixel brightness value is decreased.

Where, the high-resolution binary image can refer to a binary image with the resolution being higher than a preset resolution threshold, and the above to-be-processed video can mean the video file mentioned in the present application.

That is to say, the spatial-domain watermark template can be any binary image with the resolution being higher than a preset resolution threshold. The binary image includes multiple pixel points, where, the pixel value of the pixel point in the binary image can be a first preset value or a second preset value. In one condition, in the binary image, the number of the pixel points with the pixel value being the first preset value is the same as the number of the pixel points with the pixel value being the second preset value, that is, the number of the pixel points with the pixel value being the first preset value contained in the spatial-domain watermark template can be the same as the number of the pixel points with the pixel value being the second preset value. In one condition, the first preset value is 1, the second preset value is 0, and in the binary image, the number of the pixel points with the pixel value being 1 is the same as the number of the pixel points with the pixel value being 0.

In one implementation mode, when the pixel value of a pixel point in the spatial-domain watermark template, that is, in a binary image, is a first preset value, for example, the pixel value is 1, it can indicate that when being superimposed with the video image, the pixel brightness value corresponding to the pixel point in the video image corresponding to the pixel point is adjusted upward, that is, the pixel brightness value corresponding to the pixel point in the video image corresponding to the pixel point is increased. When the pixel value of a pixel point in the spatial-domain watermark template is 0, it indicates that when being superimposed with the video image, the pixel brightness value corresponding to the pixel point in the video image corresponding to the pixel point is adjusted downward, that is, the pixel brightness value corresponding to the pixel point in the video image corresponding to the pixel point is decreased.

The spatial-domain watermark template includes multiple pixel points, each pixel point corresponds to one pixel value, and each pixel value corresponds to a spatial-domain value. For example, the spatial-domain watermark template includes pixel points with the pixel values being 0 and 1. When the pixel value is 1, the corresponding spatial-domain value can be set to 1, and when the pixel value is 0, the corresponding spatial-domain value can be set to −1. Where, when the spatial-domain value corresponding to a pixel point in the spatial-domain watermark template is 1, it indicates that when being superimposed with the video image, the pixel brightness value corresponding to the pixel point in the image corresponding to the pixel point is adjusted upward, that is, the pixel brightness value corresponding to the pixel point in the image corresponding to the pixel point is increased. When the spatial-domain value corresponding to one pixel point in the spatial-domain watermark template is −1, it indicates that when being superimposed with the video image, the pixel brightness value corresponding to the pixel point in the image corresponding to the pixel point is adjusted downward, that is, the pixel brightness value corresponding to the pixel point in the image corresponding to the pixel point is decreased.

Similarly, a template with opposite rules can also be adopted, for example, when the pixel value of a pixel point in the spatial-domain watermark template is 0, it indicates that when being superimposed with the video image, the pixel brightness value corresponding to the pixel point in the image corresponding to the pixel point is adjusted upward, that is, the pixel brightness value corresponding to the pixel point in the image corresponding to the pixel point is increased. When the pixel value corresponding to one pixel point in the spatial-domain watermark template is 1, it indicates that when being superimposed with the video image, the pixel brightness value corresponding to the pixel point in the image corresponding to the pixel point is adjusted downward, that is, the pixel brightness value corresponding to the pixel point in the image corresponding to the pixel point is decreased.

In the following embodiments, the following content is taken as an example for illustration: when the pixel value of a pixel point in the spatial-domain watermark template is 1, it can indicate that when being superimposed with the video image, the pixel brightness value corresponding to the pixel point in the image corresponding to the pixel point is adjusted upward, that is, the pixel brightness value corresponding to the pixel point in the image corresponding to the pixel point is increased. When the pixel value of a pixel point in the spatial-domain watermark template is 0, it indicates that when being superimposed with the video image, the pixel brightness value corresponding to the pixel point in the image corresponding to the pixel point is adjusted downward, that is, the pixel brightness value corresponding to the pixel point in the image corresponding to the pixel point is decreased.

Step 102: determining edge distribution of each video image frame in the video file.

When the edge distribution of the video image is determined, the video image can be subjected to edge detection first, and then the video image is normalized to positive numbers between 0 and 1 based on detection results. The normalization processing results include the edge parameter values corresponding to each pixel point, specifically, the edge parameter value corresponding to the pixel point at an image edge is 1, while the edge parameter value corresponding to the pixel point at the position other than an edge is 0.

That is, in the present step, for each video image in the video file, when the edge distribution of the video image is determined, edge detection can be performed on the video image to obtain detection results; further, the video image is subjected to normalization processing based on the detection results again, to obtain results of normalization processing. Where, the results of normalization processing include the edge parameter values corresponding to each pixel point in the video image, and the value range of the edge parameter values corresponding to each pixel point in the video image can be from 0 to 1. In one condition, the closer the edge parameter value corresponding to the pixel point in the video image approaches 1, the greater the strength of the edge pixel point is, that is, the closer the pixel point approaches the edge; the closer the edge parameter value corresponding to the pixel point in the video image approaches 0, the smaller the strength of the edge pixel point is, that is, the further the pixel point is away from the edge of the video image. In one condition, the above range value is from 0 to 1, and can include 0 and 1.

In one condition, after a certain pixel point in a video image frame is subjected to edge detection, when the judged edge parameter value is 1, it indicates that the pixel point is located at the edge position, while when the judged edge parameter value is 0, the pixel point is judged to be located at a position other than the edge.

Through edge detection, the edge parameter value set E corresponding to each video image frame can be obtained, for example, the edge parameter value set E can be represented through Et, i, j. Et, i, j can represent whether the pixel point at the $i^{th}$ row and $j^{th}$ column of the $t^{th}$ video image frame is the strength of the edge position, and can further determine the strength of adding watermarks to the video images.

In one condition, when the edge parameter value corresponding to the pixel point in the video image is 1, it represents that the strength at the edge position of the pixel point is the maximum, and when the edge parameter value corresponding to the pixel point in the video image is 0, it represents that the strength at the edge position of the pixel point is the minimum.

For specific manners of image edge detection and normalization processing on video images, please refer to related technologies, and the specific manners will not be specifically limited in an embodiment of the present application.

Step 103: generating watermarks for the video file according to the spatial-domain watermark and time-domain value corresponding to each video image frame and the edge distribution of each video image frame in the video file.

The generation of watermarks for video files is in fact the adjustment of pixel brightness value of the pixel point in the video image. In the present step, the target pixel brightness values of each pixel point in each video image frame are respectively determined through the spatial-domain watermarks and time-domain value corresponding to the video image and the edge distribution of each video image frame in the video file. The target pixel brightness values corresponding to each pixel point are respectively utilized to substitute the corresponding initial pixel brightness value, to finish embedding of watermarks and generate watermarks for the video file.

Where, the initial pixel brightness value is just the pixel brightness value corresponding to each pixel point in each video image frame in the video file before watermarks are added.

In the video watermark generation method provided in an embodiment of the present application, watermark data in two dimensionalities, that is, spatial-domain watermarks and time-domain watermarks, are embedded into the video image. Compared with the related art in which only spatial-domain watermarks are embedded, video watermarks generated through the video watermark generation method provided in an embodiment of the present application have a stronger performance in preventing malicious recognition. In addition, in the video watermark generation method provided in an embodiment of the present application, watermarks are only embedded at the image edge of the video image, the watermarks are better concealed and are not easily discovered by those malicious parties.

Figure 2:
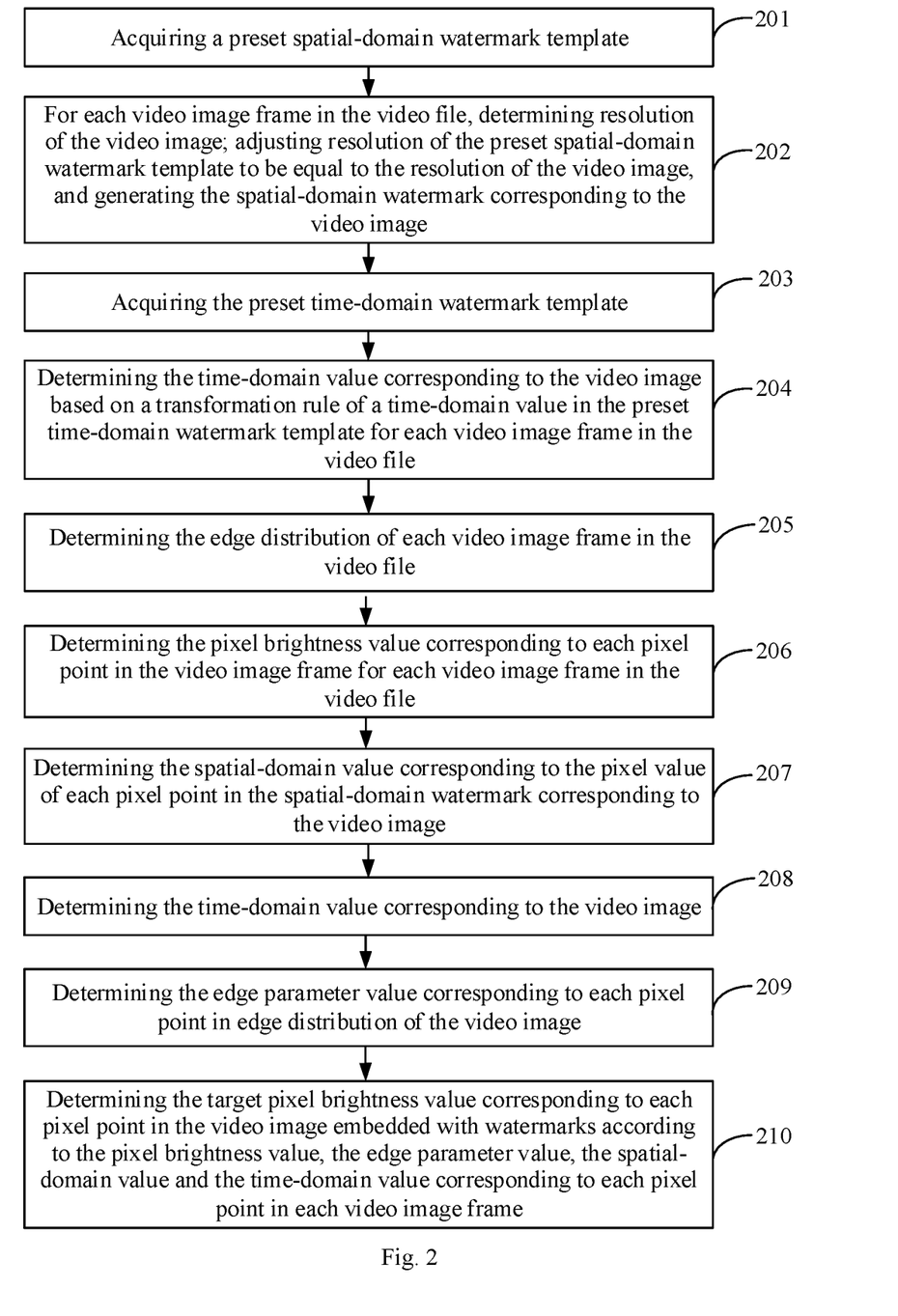
FIG. 2 is a flow chart of steps of a video watermark generation method of embodiment 2 of the present application.

Please refer to FIG. 2 which shows a flow chart of steps of a video watermark generation method of embodiment 2 of the present application.

The video watermark generation method in an embodiment of the present application can specifically include the following steps.

Step 201: acquiring a preset spatial-domain watermark template.

The spatial-domain watermark template includes pixel points with the pixel values being a first preset value and a second preset value, each pixel point corresponds to one pixel value, each pixel value corresponds to a spatial-domain value, and the spatial-domain watermark template has the same number of pixel values, to ensure low frequency of the spatial-domain watermark template locally and high frequency of the spatial-domain watermark template globally. That is to say, when a small block of spatial-domain watermark template is intercepted arbitrarily, the pixel values in the block are equal, however, changes are various overall.

The number of first preset values and the number of the second preset values in the spatial-domain watermark template are equal, and the first preset value and the second preset value can be respectively 1 and −1.

Step 202: for each video image frame in the video file, determining the resolution of the video image; adjusting the resolution of the spatial-domain watermark template to be equal to the resolution of the video image, and generating the spatial-domain watermark corresponding to the video image.

The video file can include one or more video image frames. In an embodiment of the present application, the resolutions of the spatial-domain watermark template need to be adjusted respectively according to the resolution of each video image frame, to obtain the spatial-watermark watermark corresponding to each video image frame.

For example, the resolution of the video image is 50 pixels multiplying by 50 pixels, then the resolution of the spatial-domain watermark template is also adjusted to 50 pixels multiplying by 50 pixels, and the adjusted spatial-domain watermark template is the spatial-domain watermark corresponding to the video image.

Step 203: acquiring a preset time-domain watermark template.

Where, the time-domain watermark template is a result sequence generated when a cosine curve of the first preset frequency samples according to the second preset frequency, and each value in the result sequence is a time-domain value. The time-domain watermark is low-frequency locally and high-frequency globally. That is to say, two adjacent video image frames are selected arbitrarily, the time-domain values indicated by the time-domain watermark templates corresponding to the two video image frames are identical with a great probability, however, when seen from the overall timeline, the time-domain values indicated by the time-domain watermark templates corresponding to each video image frame in the overall video file are changed variously. Where, the above great probability can mean that the probability exceeds a preset probability threshold.

The first preset frequency and the second preset frequency can be set by those skilled in the art according to actual requirements, and this will not be specifically limited in an embodiment of the present application.

Step 204: determining the time-domain value corresponding to the video image based on a transformation rule of time-domain value in the time-domain watermark template for each video image frame in the video file.

For example, the time-domain watermark template can be a result sequence obtained through sampling the cosine curve with a frequency of 3 Hz at a sampling frequency of 30 Hz. In one condition, the time-domain watermark template can be identified as $F(n)=\cos((n/30)*3)$, $F(n)=>[-1, 1]$ series (result sequence), and n is the number of video image frames contained in the video file. For each video image frame, the time-domain value of the corresponding time-domain watermark is the numerical value between −1 and 1. Where, 3 Hz is the frequency of the cosine curve, that is, the first preset frequency, and 30 Hz is the sampling frequency, that is, the second preset frequency.

Step 205: determining the edge distribution of each video image frame in the video file.

A feasible manner for determining edge distribution of a video image frame is as follows: a Canny edge detection algorithm is utilized to perform image edge check on the video image, to obtain edge parameter values corresponding to each pixel point in the video image before normalization, and the edge parameter values corresponding to each pixel point in the video image are normalized between 0 and 1. The Canny edge detection algorithm is a multistage edge detection algorithm developed by Canny in 1986. Where the edge parameter value indicates whether the pixel point is at an edge; the closer the edge parameter value corresponding to the pixel point approaches 1, the closer the pixel point approaches the edge of the video image, the closer the edge parameter value corresponding to the pixel point approaches 0, the further the pixel point is away from the edge of the video image, and result of normalization processing of the image edge parameter value is E. Where, E is an edge parameter value matrix including edge parameter values, with the value range being from 0 to 1, corresponding to the pixel point in the video image. The edge parameter value corresponding to each pixel point can indicate the probability of each pixel point being the edge pixel point, and can be used to adjust to increase strength of the watermarks.

Step 201 to step 202 are specific flows for determining the spatial-domain watermark corresponding to each video image frame, step 203 to step 204 are specific flows for determining the time-domain value corresponding to each video image frame, and step 205 is the specific flow for determining edge distribution of each video image frame. During specific realization process, the three flows are not limited to the performing sequence defined in an embodiment of the present application, and the three flows can be performed according to an arbitrary sequence, and can also be performed in parallel.

The spatial-domain watermark and the time-domain value corresponding to each video image frame and the edge distribution have been determined through the above steps, and watermarks can be embedded at the image edge of the video image according to the spatial-domain watermark and the time-domain value corresponding to the video image and the image edge distribution. Specific embedding manner of watermarks is as shown in step 206 to step 210.

Step 206: determining the pixel brightness value corresponding to each pixel point in the video image frame for each video image frame in the video file. Each video image frame includes multiple pixel points, and each pixel point corresponds to one coordinate and one pixel brightness value. The pixel brightness value of one pixel point in the video image can be obtained through taking the power of the depth of the color order of two, for example, when the depth of color order is 8, the pixel brightness value of the pixel in the image is any arbitrary value between 0 to 255. Of course, the pixel brightness value is not limited to the depth of the color order, and can also be other values like 10 and 12, and correspondingly, the scope of the pixel brightness value of the pixel point is adaptively changed.

Step 207: determining the spatial-domain value corresponding to the pixel value of each pixel point in the spatial-domain watermark corresponding to the video image.

When watermarks are generated, pixel values of the pixel point in a spatial-domain watermark template are not directly employed to calculate, while the spatial-domain value corresponding to the pixel values of the pixel point in the spatial-domain watermark template is adopted to calculate, therefore, the spatial-domain value corresponding to the pixel value of each pixel point in the spatial-domain watermark template needs to be determined, that is, the spatial-domain value corresponding to each pixel point in the spatial-domain watermark template needs to be determined.

Each pixel point in the spatial-domain watermark respectively corresponds to one pixel value, and each pixel value corresponds to one spatial-domain value. The pixel value of the pixel point in the spatial-domain watermark corresponding to a certain pixel point in the video image can be determined through the coordinate of each pixel point in the spatial-domain watermark, for example, the pixel point in the spatial-domain watermark corresponding to the pixel point on the second row and second column in the video image is the pixel point on the second row and second column in the spatial-domain watermark. Further, the spatial-domain value corresponding to the pixel point in the video image is determined through the corresponding relationship between the pixel value and the spatial-domain value of the pixel point in the spatial-domain watermark.

The spatial-domain value indicates the adjustment direction of the pixel brightness value of the corresponding pixel point (pixel point in the video image). The spatial-domain value can be the first numerical value or the second numerical value, wherein the first numerical value can be 1, while the second numerical value can be −1. When the spatial-domain value is 1, it indicates that the pixel brightness value of the corresponding pixel point (the pixel point in the video image) is increased, and when the spatial-domain value is −1, it indicates that the pixel brightness value of the corresponding pixel point (the pixel point in the video image) is decreased.

Step 208: determining the time-domain value corresponding to the video image.

Step 209: determining the edge parameter value corresponding to each pixel point in edge distribution of the video image.

As to the edge distribution results of the video image, the edge parameter value set corresponding to the video image is E, E is the edge parameter value matrix corresponding to each pixel point in an image frame, the number of rows of the matrix is the same as the number of rows of the pixel points in the video image, and the number of columns of the matrix is the same as the number of columns of pixel points in the video image. In an embodiment of the present application, through the coordinate of the pixel points in the video image, the edge parameter value corresponding to a certain pixel point in a video image in the video image edge distribution results can be determined.

Step 210: determining the target pixel brightness value corresponding to each pixel point in the video image embedded with watermarks according to the pixel brightness value, the edge parameter value, the spatial-domain value and the time-domain value corresponding to each pixel point in each video image frame.

Step 206 to step 210 are specific flows for embedding watermarks into a video image frame. In specific realization process, step 206 to step 210 are performed repeatedly, to embed watermarks to each video image frame in the video file to finally achieve the purpose of generating watermarks for the video file.

The manner of optionally determining the target pixel brightness value corresponding to each pixel point in the video image embedded with watermarks according to the pixel brightness value, the edge parameter value, the spatial-domain value and the time-domain value corresponding to each pixel point in each video image frame is as follows.

Firstly, for each pixel point in each video image frame, a product value of the spatial-domain watermark value, the time-domain value and the edge parameter value corresponding to the pixel point and a preset constant is determined; secondly, the sum of the product value and the pixel brightness value is determined to be the target pixel brightness value corresponding to the pixel point in the video image embedded with watermarks. Where, the preset constant can be set by those skilled in the art according to actual requirements, and will not be specifically limited in an embodiment of the present application.

Specifically, the following formula can be adopted to calculate the target pixel brightness value corresponding to each pixel point in the video image embedded with watermarks:

$$O_{t,j} = I_{t,j} + \alpha * S'_{i,j} * T_t * E_{t,i,j}.$$

Where, I represents the original video file before watermarks are not embedded; It represents the $t^{th}$ video image frame before watermarks are embedded; It, i, j represents the pixel brightness value corresponding to the pixel point with a coordinate of (i, j) in the $t^{th}$ video image frame before watermarks are embedded; O represents the video file embedded with watermarks; Ot represents the $t^{th}$ video image frame embedded with watermarks; Ot, i, j represents the pixel brightness value corresponding to the pixel point with a coordinate of (i, j) in the $t^{th}$ video image frame embedded with watermarks, that is, the target pixel brightness value; α is a constant which represents adjustment strength of the pixel value, a is generally a scalar which can represent the adjustment multiple of the pixel brightness value; S'i, j represents the spatial-domain value corresponding to the pixel point with the coordinate being (i, j) in the spatial-domain watermark; Tt represents the time-domain value corresponding to the $t^{th}$ video image frame; Et, i, j represents the edge parameter value corresponding to the pixel point with the coordinate being (i, j) in the $t^{th}$ video image frame in the image edge distribution results. Where, α*S'i, j*Tt*Et, i, j can identify a product value of the spatial-domain watermark value, the time-domain value and the edge parameter value corresponding to the pixel point with the coordinate being determined to (i, j) and a preset constant.

Suppose that the pixel brightness value of the pixel point in the video image is any numerical value from 0 to 255, when the edge parameter value Et, i, j corresponding to a certain pixel point in the video image is 0, it indicates that the pixel brightness value of the pixel point does not need to be adjusted, and the original pixel brightness value is kept unchanged. If the edge parameter value Et, i, j corresponding to the pixel point is 1, it indicates that the adjusted strength of the pixel brightness value of the pixel point is 1, and the specific adjustment direction needs to be determined according to plus or minus characteristic of S'i, j spatial-domain value corresponding to the pixel point. When the strength is 1, the pixel brightness value of the pixel point is increased, when the strength is −1, the pixel brightness value of the pixel point is decreased. The specific adjusted value of the pixel brightness value is determined by a, if a is 5 and S'i, j is 1, then the pixel brightness value of the pixel point is increased by 5, if a is 5 and S'i, j is −1, then the pixel brightness value of the pixel point is decreased by 5.

If the edge parameter value Et, i, j corresponding to the pixel point is 0.6, it indicates that the adjusted strength of the pixel brightness value of the pixel point is 0.6, and the specific adjustment direction needs to be determined according to plus or minus characteristic of S'i, j spatial-domain value corresponding to the pixel point. When the strength is 1, the pixel brightness value of the pixel point is increased, when the strength is −1, the pixel brightness value of the pixel point is decreased. The specific adjusted value of the pixel brightness value is determined by a, if a is 5 and S'i, j is 1, then the pixel brightness value of the pixel point is increased by 3(5*0.6), if a is 5 and S'i, j is −1, then the pixel brightness value of the pixel point is decreased by 3(5*0.6).

In one implementation mode, suppose that the pixel brightness value of the pixel point in the video image is represented by an 8-bit binary as any numerical value of 0 to 255, if the pixel brightness value corresponding to the pixel point in the video image is 255, at this time, the pixel brightness value is adjusted to be increased, since 255 is already an upper limit of the pixel brightness value, therefore, no adjustment is needed. If the pixel brightness value corresponding to the pixel point is 0, at this time, when the pixel brightness value needs to be adjusted to be decreased, no adjustment is needed.

Correspondingly, if the pixel brightness value corresponding to the pixel point is 253, at this time, when the pixel brightness value is adjusted to be increased by 3, since 255 is already an upper limit of the pixel brightness value, the pixel brightness value only needs to be adjusted to 255; similarly, if the pixel brightness value corresponding to the pixel point is 2, at this time, when the pixel brightness value needs to be decreased by 3, the pixel brightness value only needs to be adjusted to 0 during adjustment.

The video watermark generation method provided in an embodiment of the present application not only has the beneficial effects owned by the video watermark generation method as shown in embodiment 1, the time-domain watermark template is set to be dynamically transformed over time. When malicious parties pre-identify watermarks embedded into the video, not only the time-domain watermark template needs to be cracked, but also the change rule of the time-domain watermark template over time needs to be cracked, so the identification difficulty is high. It can be seen that, the video watermark generation method provided in an embodiment of the present application further improves performance of watermarks in preventing malicious recognition.

Figure 3:
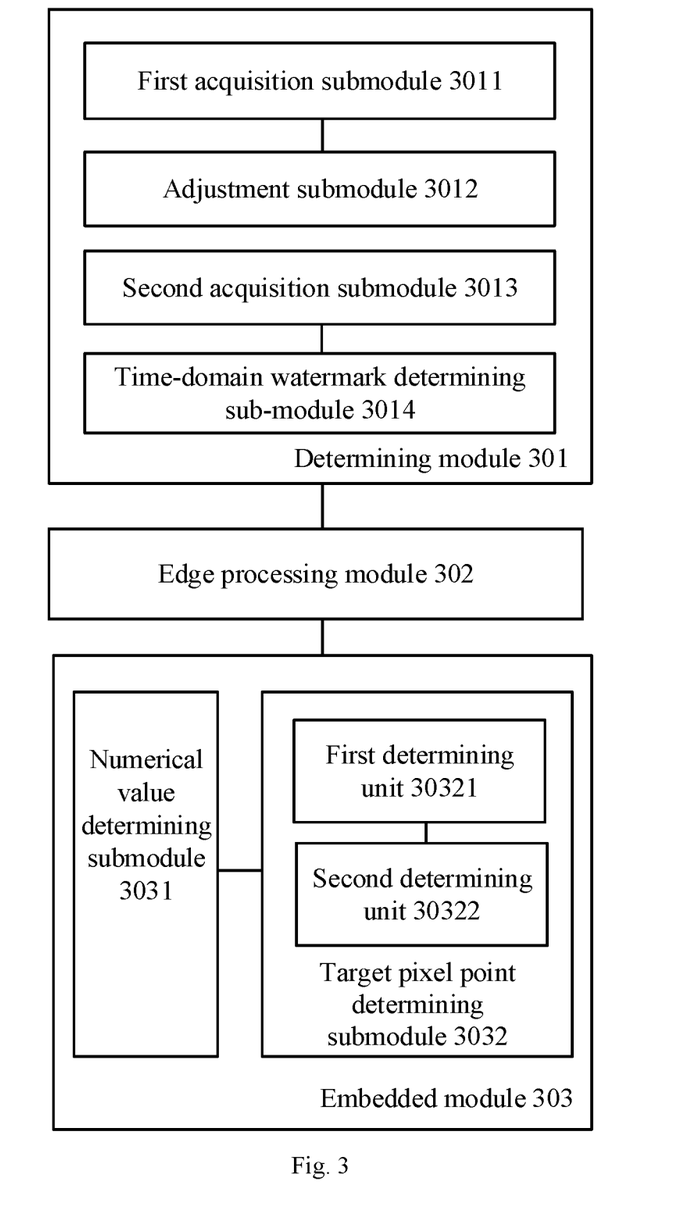
FIG. 3 is a structural diagram of a video watermark generation device of embodiment 3 of the present application.

Please refer to FIG. 3 which shows a structural diagram of a video watermark generation device of embodiment 3 of the present application.

The video watermark generation device of an embodiment of the present application can include: a watermark determining module 301, configured to determine a spatial-domain watermark and a time-domain value corresponding to each video image frame in a video file according to a preset spatial-domain watermark template and a preset time-domain watermark template; an edge processing module 302, configured to determine edge distribution of each video image frame in the video file; and an embedded module 303, configured to generate a watermark for the video file according to the spatial-domain watermark and time-domain value corresponding to the each video image frame and the edge distribution of the each video image frame in the video file.

Optionally, the spatial-domain watermark has the same number of pixel values.

Optionally, the embedded module 303 can include: a numerical value determining submodule 3031, configured to, for the each video image frame in the video file, determine a pixel brightness value corresponding to each pixel point in the video image, a spatial-domain value corresponding to a pixel value of each pixel point in the spatial-domain watermark corresponding to the video image, the time-domain value corresponding to the video image and an edge parameter value corresponding to each pixel point in the edge distribution of the video image; where the spatial-domain value indicates an adjustment direction of the pixel brightness value, and the edge parameter value indicates whether a pixel point is located at an edge; and a target pixel value determining submodule 3032, configured to determine a target pixel brightness value corresponding to each pixel point in a video image embedded with watermarks according to the pixel brightness value corresponding to each pixel point in each video image frame, the edge parameter value, the spatial-domain value and the time-domain value.

Optionally, the target pixel value determining submodule 3032 can include: a first determining unit 30321, configured to, for the each pixel point in the each video image frame, determine a product value of the spatial-domain watermark value, the time-domain value, the edge parameter value corresponding to the pixel point and a preset constant; and a second determining unit 30322, configured to determine the sum of the product value and the pixel brightness value to be the target pixel brightness value corresponding to the pixel point in the video image embedded with watermarks.

Optionally, the watermark determining module 301 includes: a first acquisition submodule 3011, configured to acquire a preset spatial-domain watermark template; an adjustment submodule 3012, configured to determine the resolution of the video image for each video image frame in the video file, and adjust the resolution of the spatial-domain watermark template to be equal to the resolution of the video image to generate a spatial-domain watermark corresponding to the video image; a second acquisition submodule 3013, configured to acquire a preset time-domain watermark template; and a time-domain watermark determining submodule 3014, configured to determine the time-domain watermark corresponding to the video image based on a transformation rule of a time-domain value in the time-domain watermark template for each video image frame in the video file.

Optionally, the spatial-domain watermark template includes pixel points with pixel values being a first preset value and a second preset value; and the time-domain watermark template is a result sequence generated when a cosine curve of the first preset frequency samples according to the second preset frequency. The mobile terminal in an embodiment of the present application is configured to realize the corresponding video watermark generation method in the above embodiment 1 and embodiment 2, and has beneficial effects corresponding to the method embodiment, and will not be repeated redundantly herein.

Figure 4:
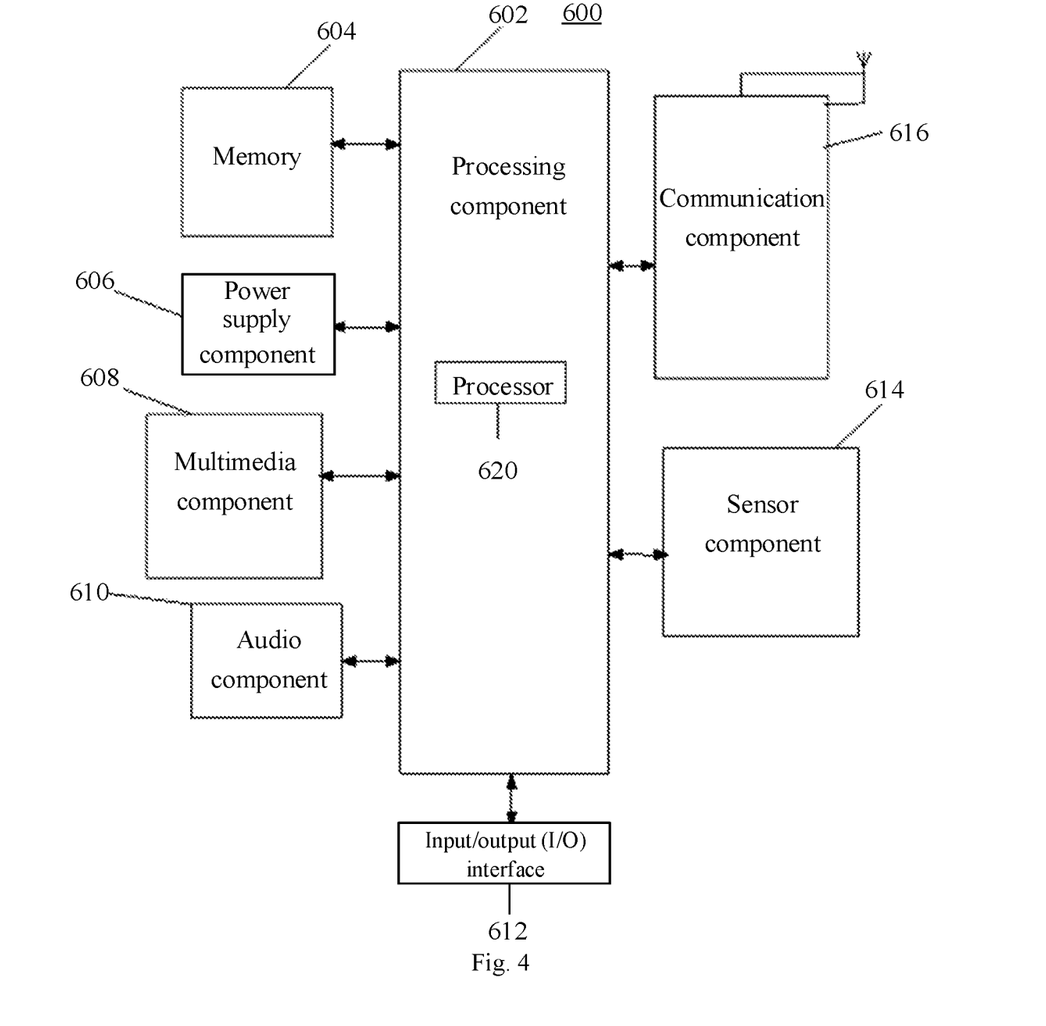
FIG. 4 is a structural diagram of a terminal of embodiment 4 of the present application.

Please refer to FIG. 4 which shows a structural diagram of a terminal for generating video watermarks in embodiment 4 of the present application.

The terminal in an embodiment of the present application can include: a memory, a processor and a video watermark generating program stored on the storage and capable of running on the processor, where the video watermark generating program is executed by the processor to realize the steps of any of the video watermark generation methods in the present application.

FIG. 4 is a block diagram of a video watermark generating terminal 600 shown according to an exemplary embodiment. For example, the terminal 600 can be a mobile phone, a computer, a digital broadcasting terminal, a message transceiving device, a game console, a tablet device, a medical device, fitness equipment and a personal digital assistant.

Please refer to FIG. 4, and the terminal 600 can include at least one or more components: a processing component 602, a memory 604, a power supply component 606, a multimedia component 608, an audio component 610 and an input/output (I/O) interface 612, a sensor component 614 and a communication component 616.

The processing component 602 generally controls overall operation of a terminal 600, such as operations related to display, telephone call, data communication, camera operation and record operation. The processing component 602 can include one or more processors 620 to execute instructions, to finish all or part of the steps of the above method. In addition, the processing component 602 can include one or more modules, to facilitate interaction between the processing component 602 and other components. For example, the processing component 602 can include a multimedia module, to facilitate interaction between the multimedia component 608 and the processing component 602.

The memory 604 is configured to store various types of data to support operation on the terminal 600. The examples of these data include the instructions of any application or method operated on the terminal 600, contact data, phonebook data, message, pictures, videos, etc. The memory 604 can be realized through any type of volatile or nonvolatile storage device or the combination thereof, such as a static random access memory (SRAM), an electrically erasable programmable read-only memory (EEPROM), an electrically programmable read-only memory (EPROM), a programmable read-only memory (PROM), a read only memory (ROM), a magnetic memory, a flash memory, a magnetic disk or an optical disk.

The power supply component 606 provides electric power to various components of the terminal 600. The power supply component 606 can include a power supply management system, one or more power supplies, and other components related to generation, management and distribution of electric power of the terminal 600.

The multimedia component 608 includes a screen which provides an output interface between the terminal 600 and the user. In some embodiments, the screen can include a liquid crystal display (LCD) and a touch panel (TP). If the screen includes a touch panel, the screen can be realized as a touch panel, to receive input signals from a user. The touch panel includes one or more touch sensors to sense touch and slide and postures on the touch panel. The touch sensor can not only sense boundaries of the touch or slide action, but also can detect time duration and pressure related to the touch or slide operation. In some embodiments, the multimedia component 608 includes a front-facing camera and/or a rear camera. When the terminal 600 is in an operating mode, for example, a capturing mode or a video mode, the front-facing camera and/or the rear camera can receive external multimedia data. Each front-facing camera and rear camera can be a fixed optical lens system or have local length and optical zoom capabilities.

The audio component 610 is configured to output and/or input audio signals. For example, the audio component 610 includes a microphone (MIC), and when the terminal 600 is in an operating mode, for example, in a calling mode, a recording mode and a voice recognizing mode, the microphone is configured to receive external audio signals. The received audio signals can be further stored in the memory 604 or can be sent via a communication component 616. In some embodiments, the audio component 610 can also include a loudspeaker configured to output audio signals.

The I/O interface 612 can provide an interface between the processing component 602 and the peripheral interface modules. The above peripheral interface modules can be keyboards, click wheels and buttons, etc. These buttons can include but are not limited to a homepage button, a volume button, a start button and a locking button.

The sensor component 614 includes one or more sensors and is configured to evaluate the state of each aspect provided by the terminal 600. For example, the sensor component 614 can detect the opening/closing state of the terminal 600, and relative positioning of the component, for example, the component is a display and a keypad of the terminal 600. The sensor component 614 can also detect changes in the position of the terminal 600 or one component of the terminal 600, contact or no contact between the user and the terminal 600, the orientation or acceleration/deceleration of the terminal 600 and the temperature change of the terminal 600. The sensor component 614 can include a proximity sensor which is configured to detect the existence of nearby objects when no any physical contact exists. The sensor component 614 further includes an optical sensor, such as a CMOS or a CCD image sensor, which is used in imaging applications. In some embodiments, the sensor component 614 can further include an acceleration sensor, a gyroscope sensor, a magnetic sensor, a pressure sensor or a temperature sensor.

The communication component 616 is configured to facilitate wired or wireless communication between the terminal 600 and other devices. The terminal 600 can be connected to a wireless network based on communication standards, such as WiFi, 2G or 3G, or a combination thereof. In an exemplary embodiment, the communication component 616 receives broadcast signals or broadcast related information from an external broadcast management system via a broadcast channel. In one exemplary embodiment, the communication component 616 further includes a near-field communication (NFC) module to promote short range communication. For example, the NFC module can be realized based on a radio frequency identification (RFID) technology, an infrared data association (IrDA) technology, an ultra wide band (UWB) technology, a bluetooth (BT) technology and other technologies.

In an exemplary embodiment, the terminal 600 can be realized through one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements, to perform a video watermark generation method. Specifically, the video watermark generation method includes: according to a preset spatial-domain watermark template and a time-domain watermark template, determining the spatial-domain watermark and the time-domain value corresponding to each video image frame in the video file; determining the edge distribution of each video image frame in the video file; determining the edge distribution of each video image frame in the video file; and generating watermarks for the video file according to the spatial-domain watermark and time-domain value corresponding to each video image frame and the edge distribution of each video image frame in the video file.

Optionally, the spatial-domain watermark has the same number of pixel values.

Optionally, the generating the watermark for the video file according to the spatial-domain watermark and time-domain value corresponding to the each video image frame and the edge distribution of the each video image frame in the video file includes: for the each video image frame in the video file, determining the pixel brightness value corresponding to each pixel point in the video image, a spatial-domain value corresponding to a pixel value of each pixel point in the spatial-domain watermark corresponding to the video image, the time-domain value corresponding to the video image and an edge parameter value corresponding to each pixel point in the edge distribution of the video image, where the spatial-domain value indicates adjustment direction of the pixel brightness value, the edge parameter value indicates whether a pixel point is located at an edge; and determining the target pixel brightness value corresponding to each pixel point in a video image embedded with watermarks according to the pixel brightness value, the edge parameter value, the spatial-domain value and the time-domain value corresponding to the each pixel point in the each video image frame.

Optionally, the determining the target pixel brightness value corresponding to each pixel point in the video image embedded with watermarks according to the pixel brightness value, the edge parameter value, the spatial-domain value and the time-domain value corresponding to each pixel point in each video image frame includes: for the each pixel point in the each video image frame, determining a product value of the spatial-domain value, the time-domain value, the edge parameter value corresponding to the each pixel point and a preset constant; and determining the sum of the product value and the pixel brightness value to be the target pixel brightness value corresponding to the each pixel point in the video image embedded with watermarks.

Optionally, the determining the spatial-domain watermark and the time-domain watermark corresponding to each video image frame in the video file according to the preset spatial-domain watermark template and the preset time-domain watermark template includes: acquiring the preset spatial-domain watermark template; for each video image frame in the video file, determining the resolution of the video image; adjusting the resolution of the spatial-domain watermark template to be equal to the resolution of the video image, and generating the spatial-domain watermark corresponding to the video image; acquiring the preset time-domain watermark template; and for each video image frame in the video file, determining the time-domain value corresponding to the video image based on a transformation rule of a time-domain value in the preset time-domain watermark template.

Optionally, the spatial-domain watermark template includes pixel points with pixel values being a first preset value and a second preset value; and the time-domain watermark template is a result sequence generated when a cosine curve of a first preset frequency samples according to a second preset frequency.

In an exemplary embodiment, a non-temporary computer readable storage medium including instructions is further provided, for example, a memory 604 including instructions. The above instructions can be executed by a processor 620 of the terminal 600 to finish the above method. For example, the non-temporary computer readable storage medium can be an ROM, a random access memory (RAM), a CD-ROM, a magnetic tape, a floppy disk, and an optical data storage device.

A non-temporary computer readable storage medium is provided. When the instructions stored in the storage medium are executed by a processor of the terminal, the terminal is enabled to perform steps of any of the video watermark generation methods in the present application.

The terminal provided in an embodiment of the present application embeds watermark data in two dimensionalities, that is, spatial-domain watermarks and time-domain watermarks into the video image. Compared with the related art in which only spatial-domain watermarks are embedded, video watermarks generated through the video watermark generation method provided in an embodiment of the present application has a stronger performance in preventing malicious recognition. In addition, as to the terminal provided in an embodiment of the present application, watermarks are only embedded at the image edge of the video image, the watermarks are better concealed and are not easily discovered by those malicious parties.

Corresponding to the above method embodiment, an embodiment of the present application provides a computer program product. When the computer program product is running on a computer, the computer is enabled to perform any of the video watermark generation methods in the above embodiments.

The terminal provided in an embodiment of the present application embeds watermark data in two dimensionalities, that is, spatial-domain watermarks and time-domain watermarks into the video image. Compared with the related art in which only spatial-domain watermarks are embedded, video watermarks generated through the video watermark generation method provided in an embodiment of the present application has a stronger performance in preventing malicious recognition. In addition, as to the terminal provided in an embodiment of the present application, watermarks are only embedded at the image edge of the video image, the watermarks are better concealed and are not easily discovered by those malicious parties.

Since the device embodiment is basically similar to the method embodiment, the device embodiment is described simply. For related part, please refer to part of the description of the method embodiment.

The video watermark generation solution provided herein is not inherently related to any specific computer, virtual system or other devices. Various general-purpose systems can also be used together with teachings based on this. According to the above description, it is apparent to construct a structure required by the system of the solution of the present application. In addition, the present application is not aiming at any specific programming language. It should be understood that, the content of the present application described herein can be realized through utilizing various programming languages, moreover, the above description on specific language is to disclose the best implementation mode of the present application.

In the description provided herein, a large number of specific details are described. However, it should be understood that, the embodiment of the present application can be practised without these specific details. In some examples, well-known methods, structures and technologies are not shown in detail, so as not to obscure the understanding of the present description.

Similarly, it should be understood that, in order to simplify the present disclosure and help to understand one or more invention aspects, in the description of exemplary embodiments of the present application, the characteristics of the present application are sometimes grouped together into a single embodiment, a figure or the description thereof. However, the method of the present disclosure should not be explained to reflect the following intentions: that is, the present application to be protected claims more characteristics than the characteristics definitely recorded in each claim. More specifically speaking, as reflected in the following claims, the invention aspect lies in that the characteristics are less than all the characteristics of a single embodiment disclosed previously. Therefore, the claims abiding by specific implementation modes are hereby explicitly incorporated into the specific implementation mode, wherein each claim itself serves as a single embodiment of the present application.

Those skilled in the art can understand that, modules in a device in the embodiment can be changed self-adaptively and the modules can be set in one or more devices different from those in the present embodiment. The modules or units or components in the embodiment can be combined into one module or unit or component, and in addition, they can be divided into multiple sub-modules or sub-units or sub-components. Except that at least some such characteristics and/or processes or units are mutually exclusive, any combination can be adopted to combine all the characteristics disclosed in the present description (including accompanying claims, abstract and drawings) and all the processes or units of any method or device so disclosed. Unless otherwise definitely described, each characteristic disclosed in the present description (including accompanying claims, abstract and drawings) can be substituted by alternative characteristics which provide identical, equivalent or similar purposes.

In addition, those skilled in the art can understand that, although some embodiments described herein include some characteristics contained in other embodiments rather than other characteristics, the combination of characteristics of different embodiments means that the characteristics fall within the scope of the present application and form different embodiments. For example, in the following claims, any of the embodiments to be protected can be used in any arbitrary combined manner.

The individual component embodiments in the present application may be implemented in hardware, or in software modules running on one or more processors, or in a combination of them. Those skilled in the art should understand that, microprocessors or digital signal processors (DSP) can be used in practice to realize some or all of the functions of some or all of the components in the video watermark generation solution in the embodiment of the present application. The present application may also be implemented as part or all of the equipment or device programs (for example, computer programs and computer program products) used to execute the methods described herein. Such programs which realize the present application may be stored on a computer readable medium, or may be in a form of one or more signals. Such signals can be downloaded from Internet sites, or can be available on carrier signals, or can be provided in any other form.

It should be noted that, the above embodiments are used for illustrating the present application rather than limiting the present application, and those skilled in the art may design alternative embodiments without departing from the scope of the attached claims. In the claims, no reference numerals between parentheses shall be constructed to limit the claims. The word "include" does not exclude elements or steps that are not listed in the claims. The word "a" or "one" preceding the element does not exclude the existence of more than one such element. The present application may be realized by means of hardware consisting of a number of different elements and by means of a properly programmed computer. In the unit claims that list a number of devices, a number of these devices can be embodied by the same hardware item. The use of words "first, second, and third" does not indicate any order. These words can be interpreted as names.

The invention claimed is:

1. A video watermark generation method, comprising:
determining a spatial-domain watermark and a time-domain value corresponding to each video image frame in a video file, according to a preset spatial-domain watermark template and a preset time-domain watermark template;
determining edge distribution of the each video image frame in the video file; and
generating a watermark for the video file according to the spatial-domain watermark and time-domain value corresponding to the each video image frame and the edge distribution of the each video image frame in the video file, wherein the determining the spatial-domain watermark and the time-domain value corresponding to each video image frame in the video file according to the preset spatial-domain watermark template and the preset time-domain watermark template comprises:
acquiring the preset spatial-domain watermark template;
for each video image frame in the video file, determining resolution of the video image; adjusting resolution of the preset spatial-domain watermark template to be equal to the resolution of the video image, and generating the spatial-domain watermark corresponding to the video image;
acquiring the preset time-domain watermark template; and
for each video image frame in the video file, determining the time-domain value corresponding to the video image based on a transformation rule of a time-domain value in the preset time-domain watermark template.

2. The method according to claim 1, wherein the spatial-domain watermark has the same number of pixel values.

3. The method according to claim 2, wherein the generating the watermark for the video file according to the spatial-domain watermark and time-domain value corresponding to the each video image frame and the edge distribution of the each video image frame in the video file comprises:
for the each video image frame in the video file, determining a pixel brightness value corresponding to each pixel point in the video image, a spatial-domain value corresponding to a pixel value of each pixel point in the spatial-domain watermark corresponding to the video image, the time-domain value corresponding to the video image and an edge parameter value corresponding to each pixel point in the edge distribution of the video image, wherein the spatial-domain value indicates an adjustment direction of the pixel brightness value, and the edge parameter value indicates whether a pixel point is located at an edge; and determining a target pixel brightness value corresponding to each pixel point in a video image embedded with watermarks according to the pixel brightness value, the edge parameter value, the spatial-domain value and the time-domain value corresponding to the each pixel point in the each video image frame.

4. The method according to claim 2, wherein the determining the spatial-domain watermark and the time-domain value corresponding to each video image frame in the video file according to the preset spatial-domain watermark template and the preset time-domain watermark template comprises:

acquiring the preset spatial-domain watermark template;

for the each video image frame in the video file, determining resolution of the video image; adjusting resolution of the preset spatial-domain watermark template to be equal to the resolution of the video image, and generating the spatial-domain watermark corresponding to the video image;

acquiring the preset time-domain watermark template; and for the each video image frame in the video file, determining the time-domain value corresponding to the video image based on a transformation rule of a time-domain value in the preset time-domain watermark template.

5. The method according to claim 1, wherein the generating the watermark for the video file according to the spatial-domain watermark and time-domain value corresponding to the each video image frame and the edge distribution of the each video image frame in the video file comprises:

for the each video image frame in the video file, determining a pixel brightness value corresponding to each pixel point in the video image, a spatial-domain value corresponding to a pixel value of each pixel point in the spatial-domain watermark corresponding to the video image, the time-domain value corresponding to the video image and an edge parameter value corresponding to each pixel point in the edge distribution of the video image, wherein the spatial-domain value indicates an adjustment direction of the pixel brightness value, and the edge parameter value indicates whether a pixel point is located at an edge; and determining a target pixel brightness value corresponding to each pixel point in a video image embedded with watermarks according to the pixel brightness value, the edge parameter value, the spatial-domain value and the time-domain value corresponding to the each pixel point in the each video image frame.

6. The method according to claim 5, wherein the determining the target pixel brightness value corresponding to each pixel point in the video image embedded with watermarks according to the pixel brightness value, the edge parameter value, the spatial-domain value and the time-domain value corresponding to the each pixel point in the each video image frame comprises:

for the each pixel point in the each video image frame, determining a product value of the spatial-domain value, the time-domain value, the edge parameter value corresponding to the each pixel point and a preset constant; and determining a sum of the product value and the pixel brightness value to be the target pixel brightness value corresponding to the each pixel point in the video image embedded with watermarks.

7. The method according to claim 1, wherein the spatial-domain watermark template comprises pixel points with pixel values being a first preset value and a second preset value; and the time-domain watermark template is a result sequence generated when a cosine curve of a first preset frequency samples according to a second preset frequency.

8. A video watermark generation device, comprising a memory, a processor, and a video watermark generating program stored on the memory and capable of running on the processor, wherein the video watermark generating program is executed by the processor to:

determine a spatial-domain watermark and a time-domain value corresponding to each video image frame in a video file according to a preset spatial-domain watermark template and a preset time-domain watermark template;

determine edge distribution of the each video image frame in the video file; and generate a watermark for the video file according to the spatial-domain watermark and time-domain value corresponding to the each video image frame and the edge distribution of the each video image frame in the video file, wherein the determining the spatial-domain watermark and the time-domain value corresponding to each video image frame in the video file according to the preset spatial-domain watermark template and the preset time-domain watermark template comprises:

acquiring the preset spatial-domain watermark template;

for each video image frame in the video file, determining resolution of the video image; adjusting resolution of the preset spatial-domain watermark template to be equal to the resolution of the video image, and generating the spatial-domain watermark corresponding to the video image;

acquiring the preset time-domain watermark template; and for each video image frame in the video file, determining the time-domain value corresponding to the video image based on a transformation rule of a time-domain value in the preset time-domain watermark template.

9. The device according to claim 8, wherein the spatial-domain watermark has the same number of pixel values.

10. The device according to claim 8, wherein the video watermark generating program is further executed by the processor to:

for the each video image frame in the video file, determine a pixel brightness value corresponding to each pixel point in the video image, a spatial-domain value corresponding to a pixel value of each pixel point in the spatial-domain watermark corresponding to the video image, the time-domain value corresponding to the video image and an edge parameter value corresponding to each pixel point in the edge distribution of the video image; wherein the spatial-domain value indicates an adjustment direction of the pixel brightness value, and the edge parameter value indicates whether a pixel point is located at an edge; and determine a target pixel brightness value corresponding to each pixel point in a video image embedded with watermarks according to the pixel brightness value, the edge parameter value, the spatial-domain value and the time-domain value corresponding to the each pixel point in the each video image frame.

11. The device according to claim 10, wherein the video watermark generating program is further executed by the processor to:
for the each pixel point in the each video image frame, determine a product value of the spatial-domain watermark value, the time-domain value, the edge parameter value corresponding to the each pixel point and a preset constant; and
determine a sum of the product value and the pixel brightness value to be the target pixel brightness value corresponding to the each pixel point in the video image embedded with watermarks.

12. A non-transitory computer readable storage medium, wherein the computer readable storage medium is stored with a video watermark generating program thereon, and the video watermark generating program is executed by a processor to realize the video watermark generation method according to claim 1.

13. A non-transitory computer program product, wherein when the computer program product is running on a computer, the computer is enabled to perform the video watermark generation method according to claim 1.

* * * * *